3,204,011
DEFLUORINATION PROCESS
George R. Hettick, Joe Van Pool, and Charles C. Chapman, all of Bartlesville, Okla., assignors to Phillips Petroleum Company, a corporation of Delaware
Filed Feb. 25, 1963, Ser. No. 260,530
6 Claims. (Cl. 260—683.42)

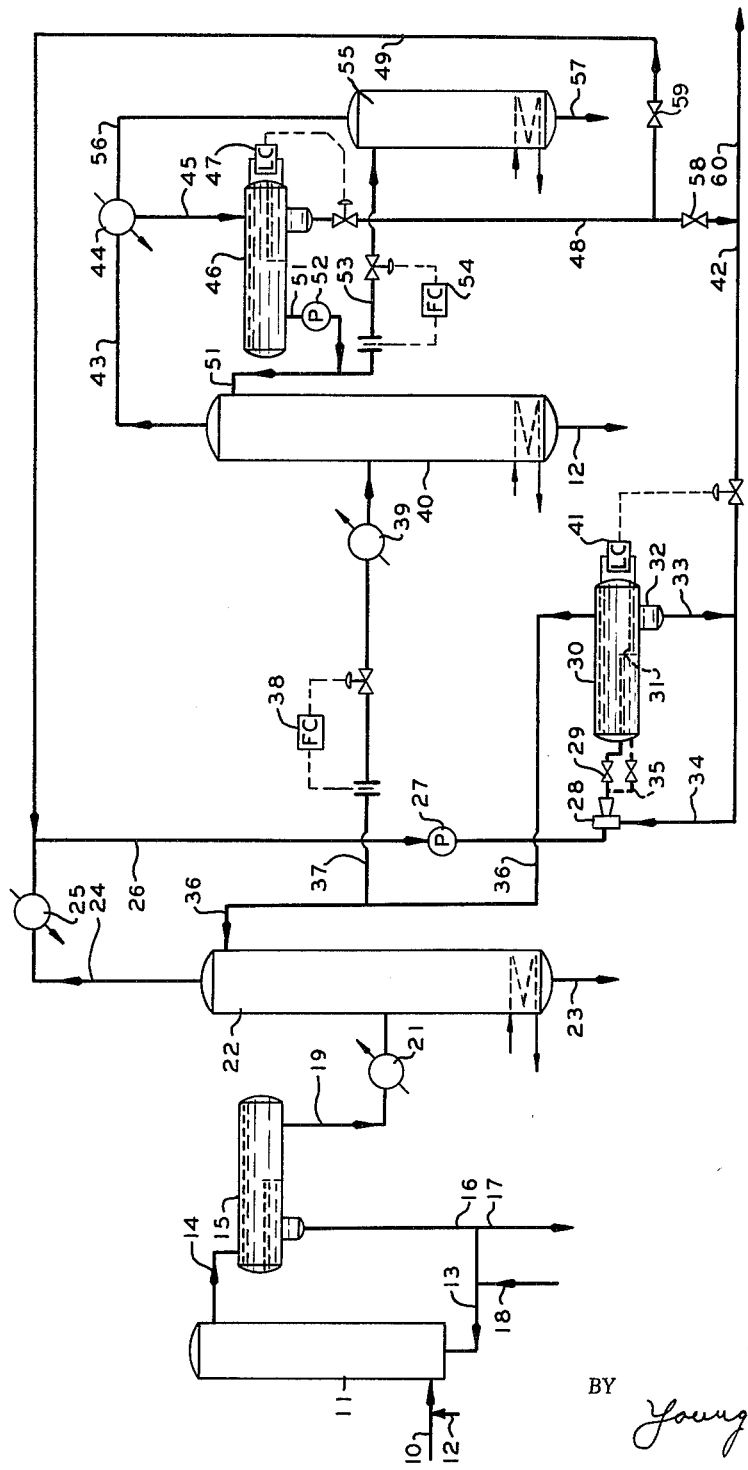

This invention relates to the treatment of organic compounds with liquid hydrogen fluoride (HF). In one aspect it relates to the removal of organic fluorides from organic materials containing the same. In one specific aspect it relates to an improved process for the removal of alkyl fluorides from a low-boiling hydrocarbon such as propane.

In processes wherein fluorine-containing catalysts such as hydrogen fluoride and boron-trifluoride are used, small proportions of organic fluorine-containing by-products are formed. These processes can involve such reactions as isomerization, polymerization, alkylation and disproportionation of relatively low-boiling hydrocarbons.

In those processes wherein propylene is a component of the feed to the HF catalyzed reaction, alkyl fluorides are formed which are practically impossible to remove from the propane by-product by conventional distillation steps and the presence of these alkyl fluorides in the product propane is objectionable for many of the end uses of the propane. Growing uses for propane have required more complete removal of alkyl fluorides from the propane and these increased demands for more complete removal of the alkyl fluorides have become an acute problem in the HF catalyzed hydrocarbon conversion processes. The problem of the propane by-product occurs only when propylene is included with the butylene in a process such as the alkylation of isobutane with an olefin because when only butylene is employed the propane by-product is insignificant and usually is not recovered separately. We have found that when the propylene-to-butylene ratio in the feed is about 65 to 35, the organic fluorine compounds in the hydrocarbon phase of the reactor effluent amount to about 1000 p.p.m. and when the propylene-to-butylene ratio in the feed to the reactor is about 40 to 60 the organic fluorine compounds in the hydrocarbon reactor effluent amount to about 140 p.p.m.

Various proposals have been made for the removal of organic fluorides from the by-product propane in a process such as HF catalyzed alkylation and some of these proposals have been adequate to meet the specification requirements of the past; however, such processes as have been proposed do not remove organic fluorides sufficiently to meet present-day requirements or else are unsatisfactory for continued use because of corrosion problems introduced into the process as a result of handling free HF or because of continuing chemical costs. For example, it has been proposed to remove alkyl fluorides by the use of dehydrofluorination agents such as bauxite, various metals and metal salts. HF is lost from the process in such system. The agents tend to lose their effectiveness after a period of continued use and must be replaced periodically. It has also been proposed to treat the contaminated hydrocarbon with a mixture of hydrogen fluoride and acid soluble oil (a hydrocarbon sludge produced in the process) to remove ethyl fluoride. This process appears to be a solvent extraction operation because there is no source of isobutane to be alkylated by the alkyl radical of the organic fluoride.

The present invention provides a method for reducing the fluorine compound content of propane to below that obtained by any known prior art process so as to produce a premium grade of propane without introducing a problem of corrosion to the equipment employed in the process.

The present invention provides a method whereby alkyl fluorides are removed from the hydrocarbon by what amounts to a secondary alkylation reaction. According to the process of the invention the overhead product obtained by distillation of the alkylation reactor hydrocarbon effluent is contacted with about an equal volume of liquid HF under alkylation conditions and in the presence of isobutane so that the isobutane is alkylated with the alkyl radical of the alkyl fluoride with the concomitant formation of HF.

It is an object of the present invention to contact a hydrocarbon containing an organic fluoride with about an equal volume of liquid HF under alkylation conditions so as to catalyze the decomposition of the alkyl fluoride with concomitant alkylation of isobutane with the olefin resulting from the decomposition of the organic fluoride. It is also an object of this invention to produce premium grade by-product propane from an HF catalyzed alkylation reaction wherein propylene is a component of the feed to the alkylation reaction. Other objects and advantages of the present invention will be apparent to one skilled in the art upon study of this disclosure, including the detailed description of the invention and the appended drawing wherein:

The sole figure is a schematic flow diagram illustrating a specific embodiment of the invention as applied to the treatment of hydrocarbons containing alkyl fluorides resulting from an alkylation process.

The process of the invention will now be described with reference to the drawing. It is to be understood that numerous items of equipment such as pumps, valves, etc., have been omitted from the drawing so as to simplify the description of the invention. Those skilled in the art will realize that such conventional equipment can be employed if desired.

A suitable hydrocarbon charge, such as a mixture of isobutane, propylene and butylene, is passed via conduit 10 to reactor 11 along with a recycle stream containing isobutane introduced via conduit 12. A hydrogen fluoride-containing catalyst is passed via conduit 13 to reactor 11. The effluent from the reactor is passed via conduit 14 to a settler 15 wherein separation is made between a liquid hydrocarbon phase and a liquid HF phase. The hydrocarbon phase will be saturated with HF and the HF phase will be saturated with hydrocarbon. The liquid HF phase is removed via conduit 16 and can be returned at least in part to reactor 11 via conduit 13. Generally it is desirable to pass a portion of the used catalyst to purification equipment (not shown) via conduit 17. Make-up HF is added via conduit 18 as required. The hydrocarbon phase is passed from settler 15 via conduit 19 and heater 21 to fractionator 22 wherein a fractionation distillation is conducted which distills HF, propane and alkyl fluorides, boiling in the propane range, overhead along with some isobutane. The major portion of the isobutane along with the alkylate and other higher boiling hydrocarbons is removed via conduit 23 for further treatment.

The overhead stream from fractionator 22 is passed via conduits 24, cooler 25, conduit 26, containing pump 27, to eductor 28 and thence through conduit 29 to liquid-liquid contactor 30. In contactor 30 the free HF, which represents the HF in excess of that required to saturate the hydrocarbon stream in conduit 26 forms a separate liquid phase below the hydrocarbon liquid phase in contactor 30 and a body of liquid HF is accumulated in the inlet portion of contactor 30 by means of baffle 31. Liquid HF flows over baffle 31, accumulates in leg 32 and is passed via conduits 33 and 34 to eductor 28 so that liquid HF is admixed with the hydrocarbon in eductor 28 and the mixture is passed via conduit 29 to contactor 30. Conduit 29 is shown as introducing the mixture of liquid HF and liquid hydrocarbon to about the interface of the hydrocarbon and HF phases in contactor 30 but if desired the mixture can be introduced at a point below the HF surface by means of conduit 35.

A stream of hydrocarbon is removed from the hydrocarbon layer of contactor 30 and passed via conduit 36 to fractionator 22 as reflux. A stream of hydrocarbon is removed from conduit 36 and passed via conduit 37, flow controller 38 and heater 39 to depropanizer 40. The hydrocarbon removed from contactor 30 via conduit 36 contains dissolved HF but no free HF. Excess HF is withdrawn from contactor 30 in response to liquid level controller 41 via conduits 33 and 42 and returned to reactor 11. The kettle product from depropanizer 40, comprising isobutane, is passed via conduit 12 to reactor 11 as recycle isobutane.

The overhead from depropanizer 40 is passed via conduit 43, cooler 44 and conduit 45 to accumulator 46. Liquid HF is withdrawn from accumulator 46 in response to liquid level controller 47 and is passed via conduit 48 to conduit 42 for return to reactor 11 or can be passed via conduits 48 and 49 to conduit 26 for introduction to contactor 30. The hydrocarbon phase is withdrawn from accumulator 46 via conduit 51 containing pump 52 and passed to depropanizer 40 as reflux. A portion of this stream is removed via conduit 53 containing flow controller 54 and passes as feed to stripper 55. The overhead vapors from stripper 55 are passed via conduit 56 to cooler 44 and thence to accumulator 46. Propane product depleted of organic fluorides is recovered from stripper 55 via conduit 57.

Liquid HF withdrawn from accumulator 46 by means of conduit 48 can be passed to conduit 26 and then to contactor 30 by closing valve 58 and opening valve 59. Usually this procedure will be employed only upon those occasions when the liquid HF level is contactor 30 is lower than desired.

We have found that the fluoride content of the propane product can be drastically reduced by practicing our invention at ordinary temperatures, for example, at 100° F. If more thorough removal of combined fluorine from the propane is desired, the contact step in contactor 30 can be conducted at a higher temperature, for example, temperatures up to and including about 175° F. Ordinarily it is preferred to operate at a temperature of about 100 degrees because corrosion of steel equipment is not a problem at these temperatures.

The eductor 28 is made with a Monel metal throat and is referred to in the trade as a Monel trim eductor. The Monel metal resists erosion at this point of high velocity on the part of the liquids better than does steel. It is possible to employ a pump instead of the eductor 28; however, a pump the same size as that of pump 27 would be required because substantially equal volumes of hydrocarbon and liquid HF are handled at this point. The eductor will handle a 1:1 ratio of liquid hydrocarbon and liquid HF with only a small increase in the back pressure to pump 27. Furthermore, it is advisable to avoid using a pump where more than a minor amount of liquid HF is involved because of problems introduced to packing glands and bearings. A hydrocarbon flush on all packing glands and bearings would be required in a pump handling liquid HF.

When operating according to prior art proposals, the removal of organic fluorides has never been known to exceed 90 percent whereas according to the process of this invention organic fluoride removal of 94–97 percent is obtained.

The temperatures and pressures of the distillation steps will be substantially the same when the process of the invention is practiced as those of the prior art processes. The fractionator 22 is ordinarily operated at about 200 p.s.i. with a bottom temperature of about 220° F. and a top temperature of about 135° F. Depropanizer 40 is operated at a pressure of about 285 p.s.i. with a bottom temperature of about 230° F. and a top temperature of about 140° F. Stripper 55 is operated at a pressure of about 290 p.s.i. with a bottom temperature of about 150° F. and a top temperature of about 143° F. A stripping gas ordinarily is not used.

Data obtained in the operation of a typical system such as shown in the drawing is presented in the material balance of the following table wherein the materials in the numbered columns represent the materials at the locations of corresponding numbers on the drawing.

*Table I*

| Stream | 19 | 36 | 26 | 34 | 36 | 42 | 37 | 51 |
|---|---|---|---|---|---|---|---|---|
| Component | Feed to Partial DeC3 | Reflux to Partial DeC3 | Eductor Motive Fluid | Eductor HF | Contactor Effluent | Contactor HF to Reactor | DeC3 Feed | DeC3 Reflux |
| Propane, b./hr | 75 | 117 | 177 | | 177 | | 60 | 198 |
| Isobutane, b./hr | 1,056 | 217 | 328 | | 328 | | 111 | 2 |
| n-Butane, b./hr | 39 | 16 | 25 | | 25 | | 9 | |
| Total alkylate, b./hr | 130 | | | | | | | |
| Total hydrocarbon | 1,300 | 350 | 530 | | 530 | | 180 | 200 |
| Soluble HF, lb./hr | 2,683 | 973 | 1,480 | | 1,480 | | 507 | 795 |
| Liquid HF, lb./hr | | | 2,176 | 185,500 | | 2,176 | | |
| Organic F, p.p.m | 142 | 3 | 100 | | 3 | | 3 | 7 |

| Stream | 43 | 53 | 57 | 56 | 48 | 60 | 23 | 12 |
|---|---|---|---|---|---|---|---|---|
| Component | DeC3 OH | Feed to Stripper | Stripper Bottoms | Stripper OH | HF Make from Stripper | Total HF Make | Partial DeC3 Bottoms | DeC3 Bottoms |
| Propane, b./hr | 247 | 64 | 49 | 15 | | | 15 | 11 |
| Isobutane, b./hr | 3 | 1 | 1 | | | | 945 | 110 |
| n-Butane, b./hr | | | | | | | 30 | 9 |
| Total alkylate, b./hr | | | | | | | 130 | |
| Total hydrocarbon | 250 | 65 | 50 | 15 | | | 1,120 | 130 |
| Soluble HF, lb./hr | 1,302 | 341 | | 341 | | | | |
| Liquid HF, lb./hr | | | | | 507 | 2,683 | | |
| Organic F, p.p.m | 8 | 7 | 5 | 10 | | | 31 | 1 |

The organic fluorides have been reduced from 142 p.p.m. in the feed to fractionator 22 to 5 p.p.m. in stripper 55 bottoms. This is more than 96 percent removal of organic fluorides. When the feed to fractionator 22 contains about 1000 p.p.m. organic fluorides, e.g., when the olefin feed to the alkylation reactor contains about 65 percent propylene, the organic fluoride content of the stripper 55 bottoms is about 40 to 50 p.p.m.

The above process provides savings over the prior art practices in the HF recovered, reduction in the amount of defluorination bauxite required if an after treatment is necessary to provide a substantially completely fluoride-free product, and in time saved in recharging the bauxite defluorinators.

The process of the invention provides an increased acid-to-hydrocarbon ratio in the treatment of the fluoride-containing hydrocarbon stream over the processes proposed in the prior art.

That which is claimed is:

1. A process for treating hydrocarbon materials to remove therefrom organically combined fluorine comprising:
   (1) passing a liquid hydrocarbon material containing an alkylatable material, free HF, and a minor quantity of organically combined fluorine to a contactor to separate the liquid into a liquid hydrocarbon phase and a liquid HF phase;
   (2) withdrawing liquid HF from said liquid HF phase in said contactor;
   (3) intimately admixing at least one volume of said withdrawn liquid HF with each volume of said liquid hydrocarbon material passing to said contactor; and
   (4) withdrawing liquid hydrocarbon of reduced organically combined fluorine content from the liquid hydrocarbon phase in said contactor.

2. The process according to claim 1 wherein said alkylatable material is isobutane.

3. In a hydrogen fluoride catalyzed reaction wherein organic compounds are treated with hydrogen fluoride in a reaction zone and an organic fluoride is formed as a by-product which is contained in the effluent from said reaction zone, the improvement comprising:
   (1) passing the effluent from said reaction zone to a settler to form a liquid hydrocarbon phase and a liquid HF phase;
   (2) passing liquid hydrocarbon from the liquid hydrocarbon phase in said settler to a distillation zone to produce a vaporized overhead product;
   (3) condensing the overhead product from said distillation zone to form a liquid hydrocarbon material containing an alkylatable material, free HF, and a minor quantity of organically combined fluorine;
   (4) passing said liquid hydrocarbon material to a contactor to separate the liquid into a liquid hydrocarbon phase and a liquid HF phase;
   (5) withdrawing liquid HF from the liquid HF phase in said contactor;
   (6) admixing at least one volume of said withdrawn liquid HF with each volume of said liquid hydrocarbon material passing to said contactor; and
   (7) withdrawing liquid hydrocarbon of reduced organic fluoride content from the liquid hydrocarbon phase in said contactor.

4. The process according to claim 3 wherein said alkylatable material is isobutane.

5. In a process for the conversion of hydrocarbons in the presence of a hydrogen fluoride-containing catalyst wherein the reaction product is distilled in a distillation zone and the overhead product contains an organic fluoride as an impurity, the improvement comprising the following sequential steps:
   (1) condensing the overhead product from said distillation zone to form a liquid hydrocarbon material containing an alkylatable material, free HF, and a minor quantity of organically combined fluorine;
   (2) passing said liquid hydrocarbon material to a contactor to separate the liquid into a liquid hydrocarbon phase and a liquid HF phase such that the liquid hydrocarbon material enters the contactor within the liquid HF phase;
   (3) withdrawing liquid HF from the liquid HF phase in said contactor;
   (4) intimately admixing at least one volume of said withdrawn liquid HF with each volume of said liquid hydrocarbon material passing to said contactor; and
   (5) withdrawing liquid hydrocarbon of reduced organic fluoride content from the liquid hydrocarbon phase in said contactor.

6. The process according to claim 5 wherein said alkylatable material is isobutane.

References Cited by the Examiner

UNITED STATES PATENTS

| | | | |
|---|---|---|---|
| 2,451,568 | 10/48 | Linn | 208—262 |
| 2,542,927 | 2/51 | Kelley | 260—683.42 |
| 2,832,812 | 4/58 | Belden | 260—683.42 |
| 3,073,878 | 1/63 | Johnson | 260—683.42 |

ALPHONSO D. SULLIVAN, *Primary Examiner.*